(12) United States Patent
Brownlow et al.

(10) Patent No.: US 8,825,981 B2
(45) Date of Patent: Sep. 2, 2014

(54) ALLOCATING ADDRESSABLE MEMORY REGIONS TO AN ADAPTER

(75) Inventors: Sean T. Brownlow, Rochester, MN (US); John R. Oberly, III, Rochester, MN (US); Timothy J. Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 13/013,300

(22) Filed: Jan. 25, 2011

(65) Prior Publication Data

US 2012/0191940 A1  Jul. 26, 2012

(51) Int. Cl.
*G06F 12/00* (2006.01)

(52) U.S. Cl.
USPC ......................................... 711/173

(58) Field of Classification Search
USPC ............................. 710/22; 711/22
See application file for complete search history.

(56) References Cited

U.S. PATENT DOCUMENTS

| | | | |
|---|---|---|---|
| 7,093,155 B2 * | 8/2006 | Aoki | 714/4.11 |
| 2006/0294261 A1 * | 12/2006 | Nordstrom et al. | 710/3 |
| 2009/0248937 A1 | 10/2009 | Solomon et al. | |
| 2009/0276773 A1 | 11/2009 | Brown et al. | |
| 2009/0313391 A1 | 12/2009 | Watanabe | |
| 2010/0014526 A1 | 1/2010 | Chavan et al. | |
| 2010/0082874 A1 | 4/2010 | Baba et al. | |
| 2010/0095310 A1 | 4/2010 | Oshins | |
| 2010/0180274 A1 | 7/2010 | Cherian et al. | |

* cited by examiner

*Primary Examiner* — Brian Peugh
(74) *Attorney, Agent, or Firm* — Toler Law Group

(57) ABSTRACT

A method of configuring system memory may include determining a plurality of memory regions supportable on an input/output adapter. The input/output adapter may include a physical function. A memory region of the plurality of memory regions may be allocated to the physical function when an address of the physical function is unknown. The method may further include determining the address of the physical function and associating the address of the physical function with the memory region.

15 Claims, 6 Drawing Sheets

ALLOCATING ADDRESSABLE MEMORY REGIONS TO AN ADAPTER

I. FIELD OF THE DISCLOSURE

The present disclosure relates generally to computer systems, and more particularly, to memory mapped input/output (I/O) operations involving functions that are hosted by an I/O adapter.

II. BACKGROUND

An I/O adapter may include hardware components, called physical functions, which facilitate connectivity to storage. For conducting read and write operations, each physical function may be associated with a memory mapped I/O region. Memory-mapped I/O regions may include on-board memory that is mapped into address space of a processor. Data to be written to the I/O adapter may be copied by an adapter driver to the memory mapped I/O regions, and data read in by the I/O adapter may be copied into the system memory.

As a precautionary measure, an error associated with a memory mapped I/O operation may prompt the system to halt all potentially affected processes. As such, a detected error associated with a single memory mapped I/O operation may halt read and write transactions for all physical functions. The interruption of all memory mapped I/O operations may lead to processing delays.

III. SUMMARY

In a particular embodiment, a method of configuring system memory may include determining a plurality of memory regions supportable on an input/output adapter. The input/output adapter may include a physical function. A memory region of the plurality of memory regions may be allocated to the physical function when an address of the physical function is unknown. The method may further include determining the address of the physical function and associating the address of the physical function with the memory region.

In another particular embodiment, an apparatus may include an input/output adapter that includes a physical function and a memory storing program code. A processor may be configured to access the memory and to execute the program code to initiate allocating a memory region of the plurality of memory regions to the physical function. An address of the physical function may be unknown at the time of the allocation. The processor may further be configured to execute the program code to initiate determining the address of the physical function of the input/output adapter and to initiate associating the address of the physical function with the memory region.

In another particular embodiment, a program product may include program code configured to be executed by a processor to initiate determining a plurality of memory regions supportable on an input/output adapter that includes a physical function and to initiate allocating a memory region of the plurality of memory regions to the physical function. An address of the physical function may be unknown at the time of the allocation. The processor may further be configured to execute the program code to initiate determining the address of the physical function of the input/output adapter and to initiate associating the address of the physical function with the memory region. The program product may further include a tangible computer readable medium bearing the program code.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
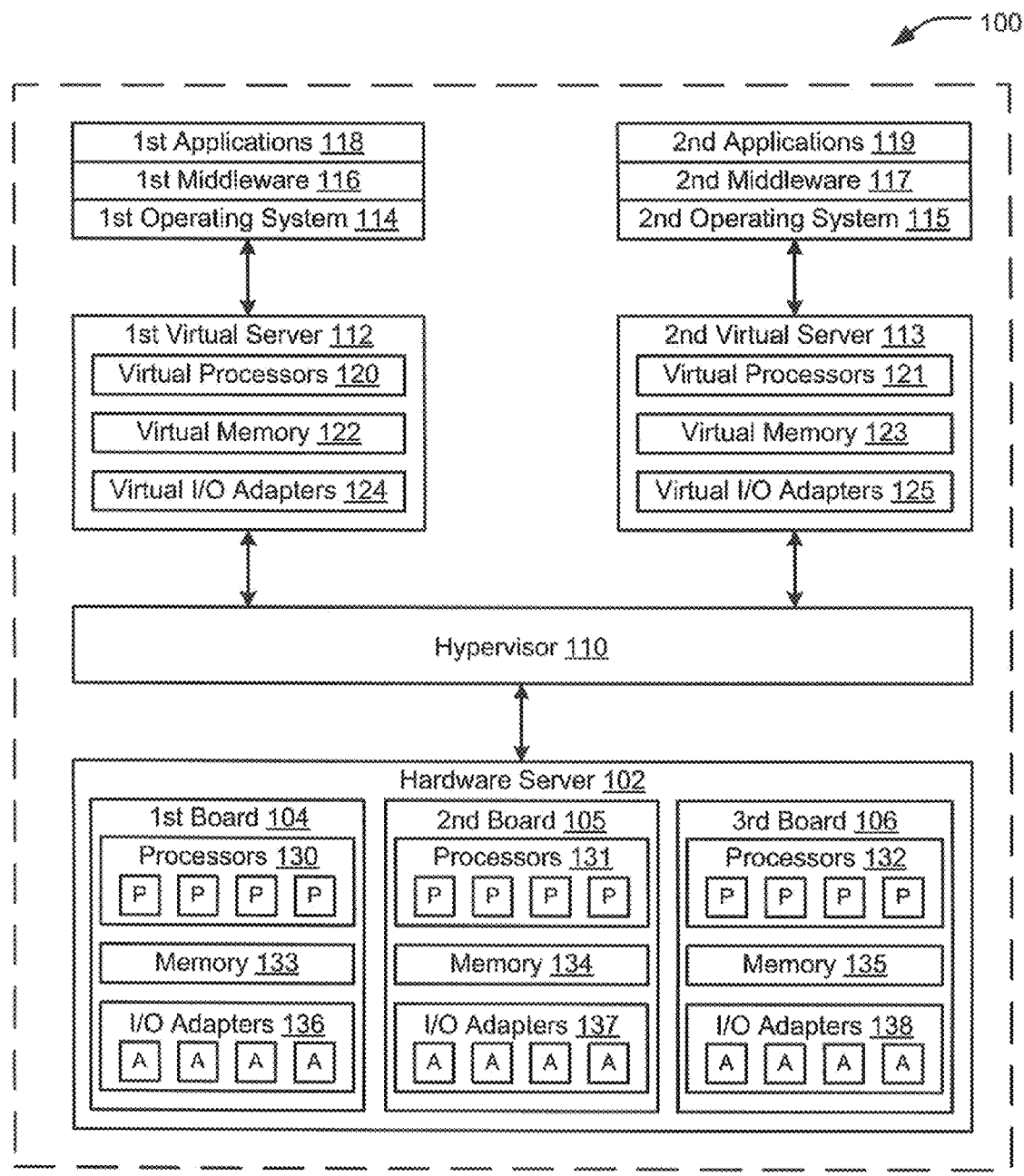
FIG. 1 is a block diagram of a first embodiment of a system to configure memory associated with one or more I/O hardware adapters.

Each physical function of an I/O adapter may be associated with a memory mapped I/O region. Isolated error domains may be created for each memory mapped I/O region. Isolating memory mapped I/O regions may allow a system to halt only those memory mapped I/O operations associated with a single memory mapped I/O region (and an associated physical function). Memory mapped I/O operations involving other physical functions and their associated virtual functions may be unaffected.

The timing involved in associating each physical function with a memory mapped I/O region may present challenges. Memory mapped I/O region parameters may not be probed in a general manner prior to execution of an adapter driver. However, memory mapped I/O regions should be mapped into address space of an adapter driver prior to boot up. In some cases, memory mapped I/O regions should be bound to distinct partitionable endpoints. Different root complex models may have different memory mapped I/O region requirements, such as different alignments and sizes, for the creation of partitionable endpoints.

Hardware page table entries may be reserved, or set aside. The entries may be used to map actual addressable memory mapped I/O regions to an effective address space in the physical function adjunct partition. Mapping of memory may be accomplished prior to booting up the physical function adjunct partition that has knowledge of the adapter specifications. For example, a table may map or otherwise associate pre-allocated memory mapped I/O regions to PCI address space. The memory mapped I/O regions may be mapped into memory of the physical function adjunct partition. The memory mapped I/O regions may be mapped without knowledge of the actual addresses of the physical functions. The adapter driver may later associate the pre-allocated memory mapped I/O regions with configuration space addresses of the physical functions (e.g., as the physical functions are configured).

The association may be communicated back to the hypervisor and the hardware page table. The adapter driver may further program the physical functions with address information. The hypervisor may program a root complex to create error domains for specific physical functions. In response to an error associated with a memory mapped I/O operation, the root complex may halt memory read and write operations associated with only the specific physical function.

A particular embodiment may identify a specific adapter model to determine how many memory mapped I/O spaces may be mapped out or otherwise supported. The memory mapped I/O regions may be placed in PCI address space in a manner that allows the memory mapped I/O regions to be mapped as partitionable endpoints. PCI addresses and an index listing the available memory mapped I/O regions may be communicated to the physical function adjunct partition in effective address space. The physical function adjunct partition may assign configuration space addresses (e.g., routing identifiers) to the physical functions as they are discovered and configured. The address information of the physical functions may be associated at the hypervisor with partitionable endpoints.

Another particular embodiment may include a configuration table used by the hypervisor to associate one or more adapter model identifiers with adapter identification information. The adapter identification information may include a maximum number of memory mapped I/O regions and a size of each memory mapped I/O region. The hypervisor may use a hardware specific algorithm to determine how many of the memory mapped I/O regions may be supported by the hardware in distinct partitionable endpoints.

The hypervisor may use the hardware specific algorithm to place the useable memory mapped I/O regions into Peripheral Component Interconnect (PCI) address space. The useable memory mapped I/O regions may be placed for a root complex to which the adapter is connected. The placement may be accomplished in a manner that enables that mapped I/O region to be later bound to a distinct partitionable endpoint for each region. A system address may be determined for each of the mapped I/O regions depending on how the root complex PCI address space is mapped into physical address space. The hypervisor may map the resulting PCI address for each available mapped I/O region to an effective address (e.g., a configuration space address) usable by the adapter driver in its own address space.

When booting the adapter driver, the hypervisor may provide the adapter driver with the system and PCI addresses associated with of each of its available mapped I/O regions. As the adapter driver configures the adapter, the adapter driver may associate unused memory mapped I/O regions for newly discovered and configured adapter physical functions. The adapter driver may program the adapter hardware with PCI addresses for each physical function based on the association. The adapter driver may send the associated memory mapped I/O region and the configuration space address to the hypervisor. The hypervisor may use the memory mapped I/O region and the configuration space address to associate that physical function with a partitionable endpoint. That is, the hypervisor may configure the root complex hardware to associate the pre-allocated and reserved memory mapped I/O regions with partitionable endpoints.

Referring to FIG. 1, a block diagram of a first embodiment of an environment configured to configure memory associated with one or more I/O hardware adapters is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and I/O adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121. The memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may configure virtual functions, such as the virtual I/O adapters 124, 125 during a time period that is prior to runtime (e.g., during a boot time period or during a firmware standby time period). Resources may be assigned to the virtual I/O adapters 124-125. During the runtime, the hypervisor 110 may assign the pre-configured virtual functions to the operating systems 114, 115 to enable applications and middleware that are executing in the operating systems 114, 115 to perform I/O operations.

Figure 2:
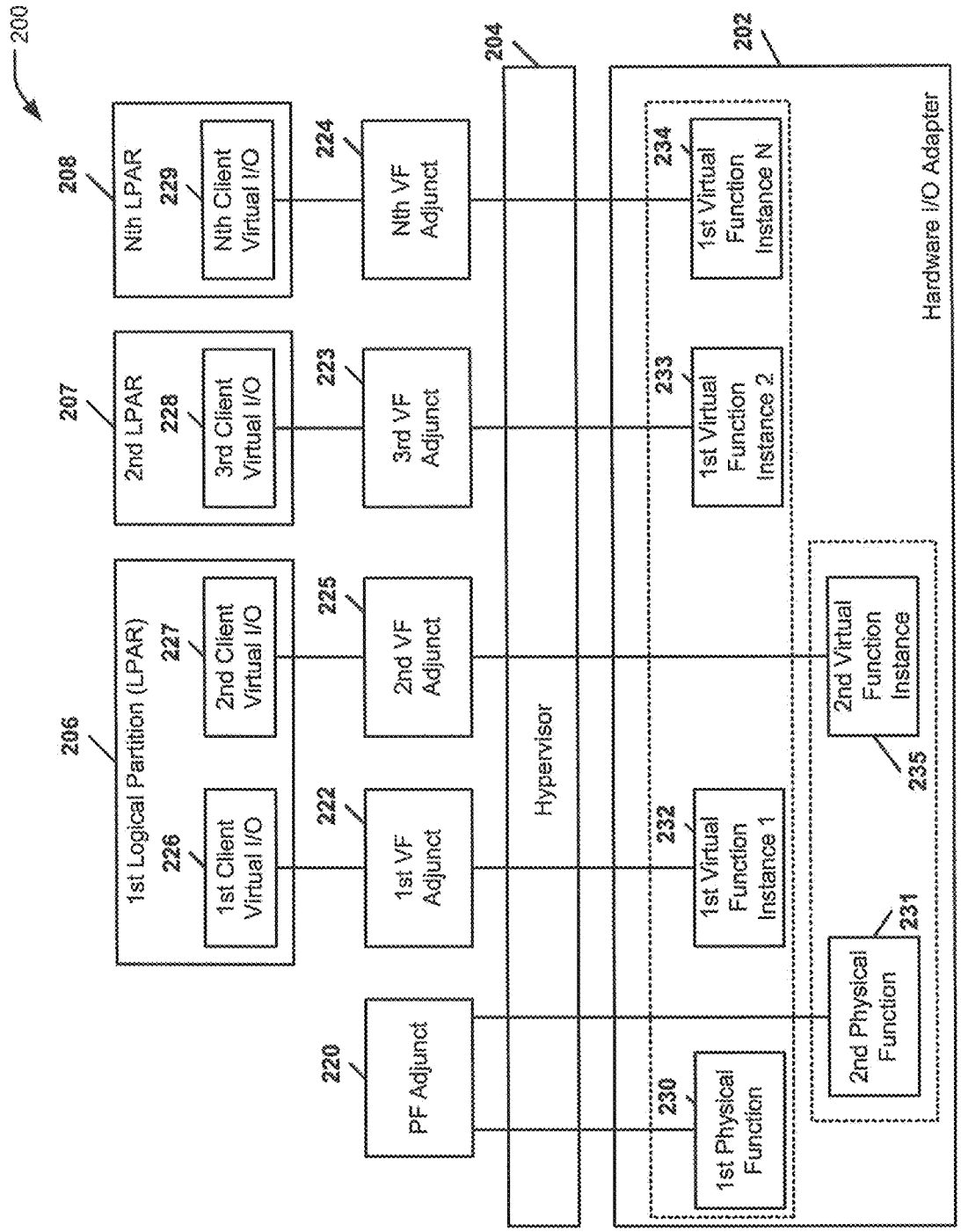
FIG. 2 is a block diagram of a second embodiment of a system to configure memory associated with one or more I/O hardware adapters.

Referring to FIG. 2, a block diagram of a second embodiment of a system configured to configure memory of an input/output hardware adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-10V). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

The hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be configured prior to a runtime and dynamically assigned during runtime, as described below. For example, the hypervisor 204 may configure virtual functions 232-235 during a time period that is prior to runtime (e.g., during a boot time period or during a firmware standby time period). During the runtime, the hypervisor 204 may assign the pre-configured virtual functions 232-235 to the logical partitions 206-208 to enable client applications that are executing in the logical partitions 206-208 to perform I/O operations.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
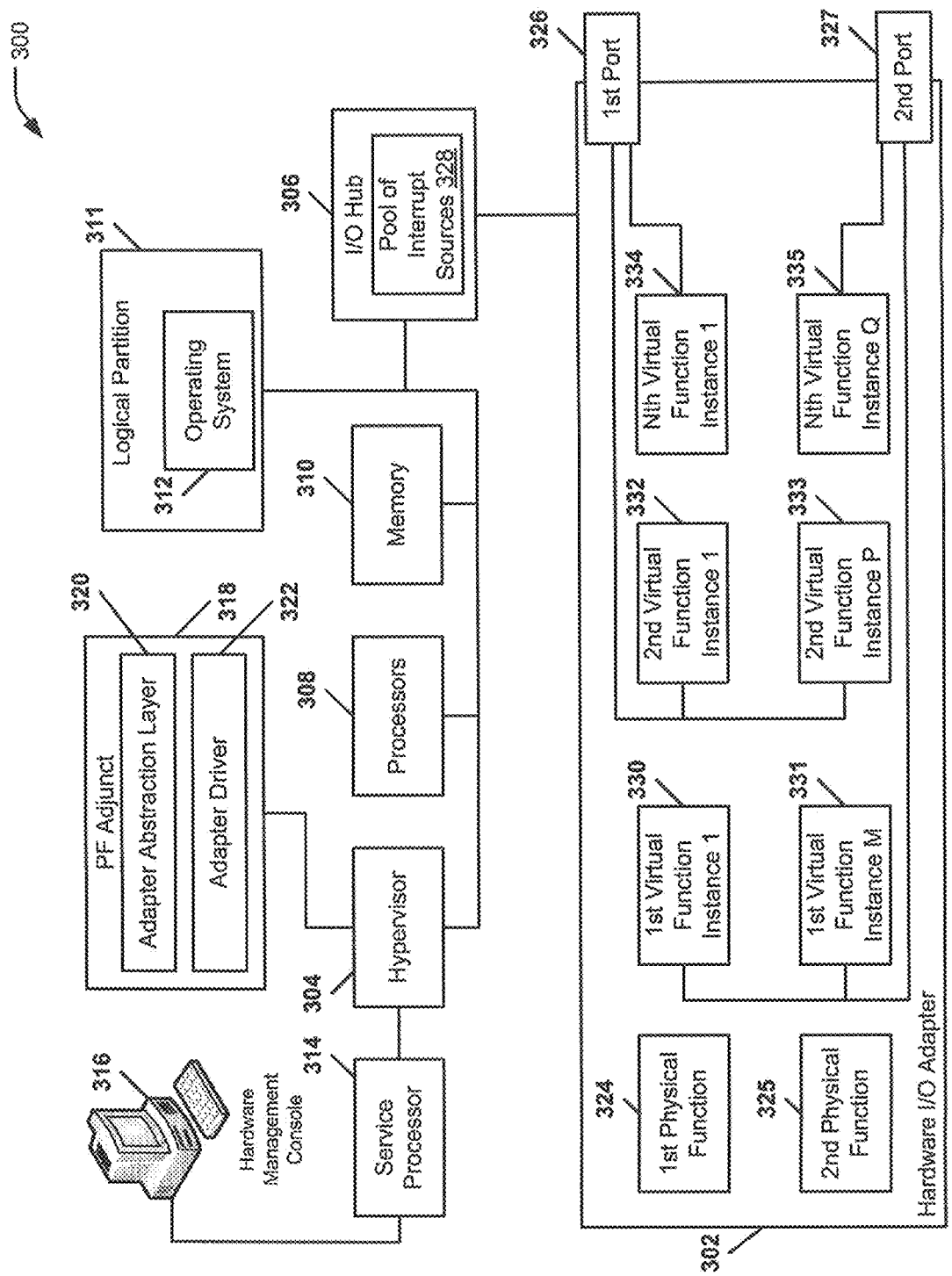
FIG. 3 is a block diagram of a third embodiment of a system to configure memory associated with one or more I/O hardware adapters.

Referring to FIG. 3, a block diagram of a third embodiment of a system to configure memory associated with an I/O hardware adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be configured prior to a runtime and dynamically assigned during runtime, as described below. For example, the hypervisor 304 may configure the virtual functions 330-335 during a time period that is prior to runtime (e.g., during a boot time period or during a firmware standby time period). During the runtime, the hypervisor 304 may assign the pre-configured virtual functions 330-335 to a logical partition (e.g., the local partition 311) to enable client applications that are executing in the logical partition to perform I/O operations.

Figure 4:
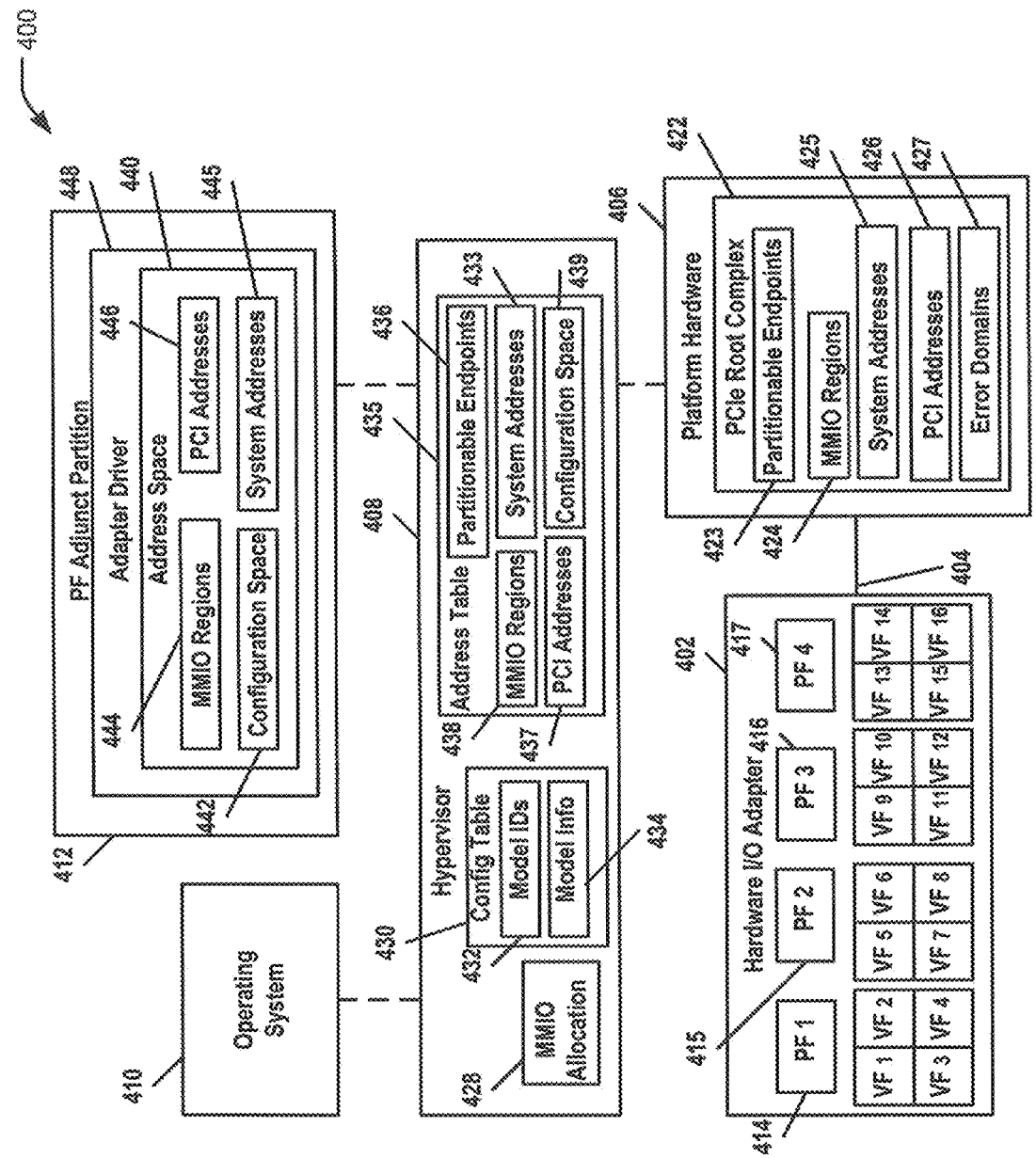
FIG. 4 is a block diagram of a fourth embodiment of a system to configure memory associated with one or more I/O hardware adapters.

Referring to FIG. 4, a block diagram of a fourth embodiment of a system to configure memory associated with an I/O adapter. The system 400 may include a hardware I/O adapter 402 that is coupled to platform hardware 406 via a Peripheral Component Interconnect Express (PCIe) bus 404. The hardware I/O adapter 402 may be similar to the hardware I/O adapters 136-138 of FIG. 1, as well as to the hardware I/O adapters 202 and 302 of FIGS. 2 and 3, respectively.

The system 400 may further include a hypervisor 408, an operating system 410, and a PF adjunct partition 412. The hypervisor 408 may be similar to the hypervisor 110 of FIG. 1, the hypervisor 204 of FIG. 2, and the hypervisor 304 of FIG. 3. The PF adjunct partition 412 may be similar to the PF adjunct 220 of FIG. 2, the VF adjuncts 222-224 of FIG. 2, and the PF adjunct 318 of FIG. 3, or a combination of both.

The hardware I/O adapter 402 may include physical functions 414-417. The physical functions 414-417 may be similar to the physical functions 324, 325 of FIG. 3. Each physical function 414-417 may be associated with one or more virtual functions VF1-VF16. A virtual function VF1-VF16 may be similar to the virtual functions 330-335 of FIG. 3.

The platform hardware 406 may include system hardware, such as processors and memory (not shown), in addition to a PCIe root complex 422. As explained below, the hypervisor 406 may provide the PCIe root complex 422 with partitionable endpoints 423, memory mapped I/O (MMIO) regions 424, and PCI addresses 426. The partitionable endpoints 423 may correspond to an address range, a PCI alignment, an address boundary, or PCI unit(s) associated with one or more of the physical functions 414-417. Though not shown, an embodiment of a PCIe root complex may additionally include configuration space addresses, or routing IDs, used to identify the physical functions on the adapter. The PCIe root complex 422 may use the PCI addresses 426 to determine system addresses 425, or real addresses, associated with the physical functions 414-417.

The PCIe root complex 422 may further create error domains 427 for each of the physical functions 414-417. The error domains 427 may include arguments and results associated with the physical functions 414-417. In response to an error associated with a memory mapped I/O operation, the PCIe root complex 422 may suspend or otherwise halt execution associated with the error domain 427 of a specific physical function 414-417. This specificity may allow operations involving the remaining physical functions 414-417 to be unaffected.

In addition to a memory mapped I/O allocation algorithm 428, the hypervisor 408 may include a configuration table 430. The configuration table 430 may be used to determine the sizes and number of memory mapped I/O regions supported by a particular model of adapter. To this end, the configuration table 430 may include adapter model identifiers 432 that may be matched to model information 434. The model information 434 may include the sizes and number of the supported memory mapped I/O regions. The configuration table 430 may additionally include information indicating how many memory mapped I/O regions are allowed on a particular slot to which the adapter is attached.

The hypervisor 408 may also include address table information 435. In a particular embodiment, the address table information 435 may be stored in a hardware page table. The address table information 435 may include a list of memory mapped I/O regions 438. The memory mapped I/O regions 438 may be populated according to the number and sizes of allowed memory mapped I/O regions determined using the configuration table 430. The hypervisor 408 may associate PCI addresses 437 with the memory mapped I/O regions 438. After startup, the PF adjunct partition 412 may provide configuration space addresses 439 associated with the physical functions 414-417 to the hypervisor 408. The hypervisor 408 of an embodiment may use the configuration space addresses 439 to determine the partitionable endpoints 436 for delivery to the PCIe root complex 422.

The PF adjunct partition 412 may include an adapter driver 448. The adapter driver 448 may be similar to the adapter driver 322 of FIG. 3. The adapter driver 448 may include an address space 440 (e.g., an effective address space) that stores configuration space addresses 439 used to identify the physical functions 414-417. The configuration space addresses 439 may be assigned as the physical functions 414-417 are discovered and configured by the adapter driver 448. The address space 440 of the adapter driver 448 may also include memory mapped I/O regions 444, system addresses 445, and PCI addresses 446 that may have been previously provided by the hypervisor 408, and that are associated with the configuration space addresses 439.

In operation, memory mapped I/O regions 438 may be reserved, or pre-allocated, to be mapped to the address space 440 in the PF adjunct partition 412. Mapping of memory may be accomplished prior to booting up the PF adjunct partition 412. The memory mapped I/O regions 438 may be associated with PCI addresses 437. The adapter driver 448 may associate the memory mapped I/O regions 444 with configuration space addresses 442 of the physical functions 414-417. The configuration space addresses 442 (associated with the mapped I/O regions 444) may be communicated back to the hypervisor 408. The adapter driver 448 may further program the physical functions 414-417 with PCI addresses. The hypervisor 408 may program the PCIe root complex 422 to create error domains 427 for specific physical functions 414-417. In response to an error associated with a memory mapped I/O operation, the root complex 422 may halt all memory reads and writes associated with the specific physical function 414-417.

The hypervisor 408 may identify the hardware I/O adapter 402 to use the configuration table 430 to determine how many memory mapped I/O spaces may be mapped. The memory mapped I/O regions 438 may be placed in PCI address space in a manner that allows the memory mapped I/O regions 438 to be mapped as partitionable endpoints 423.

Figure 5:
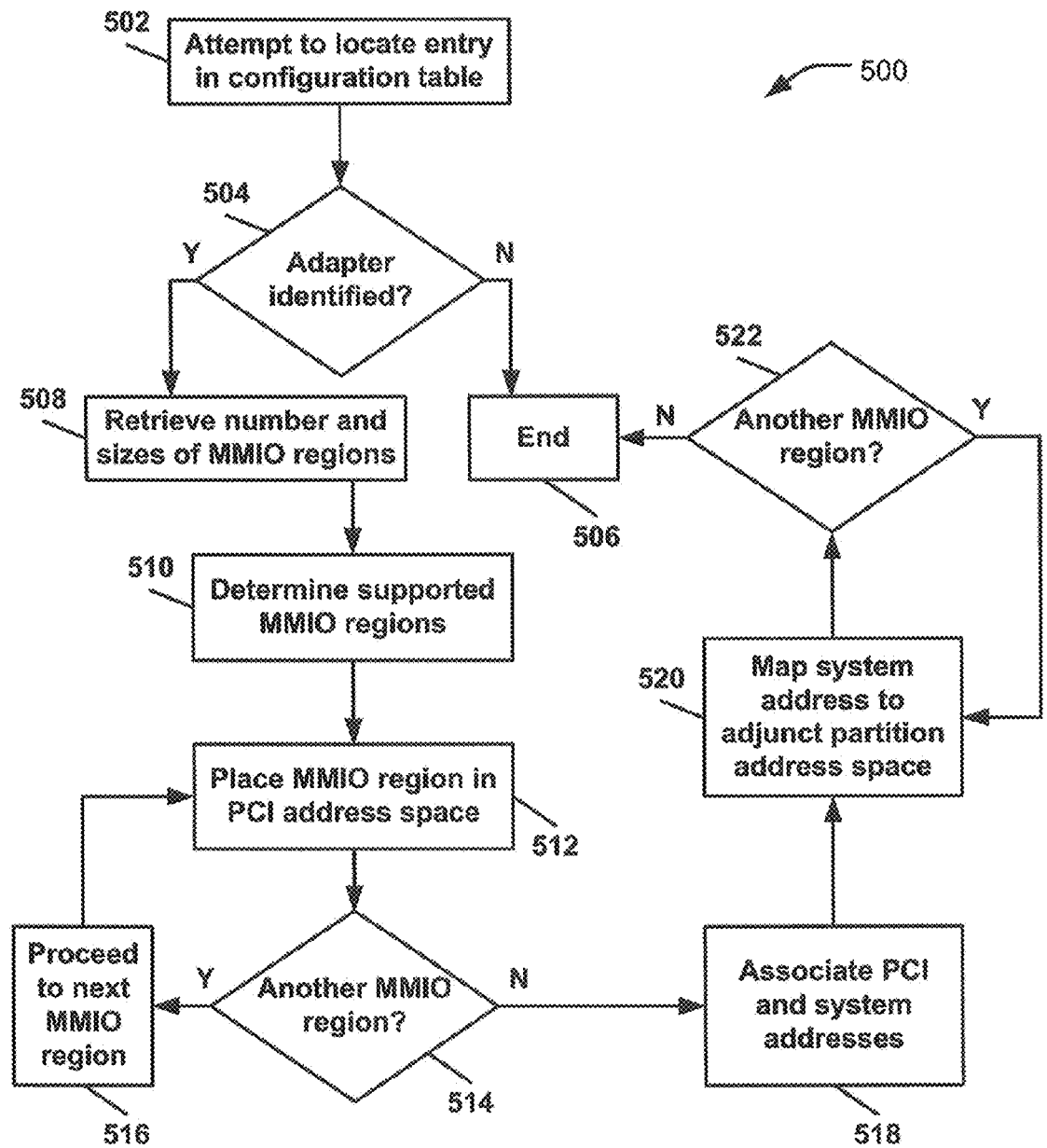
FIG. 5 is a flowchart of a process to pre-allocate memory mapped I/O regions for eventual association with partitionable endpoints that correspond to physical functions of an I/O adapter.

FIG. 5 is a flowchart 500 of an embodiment of a method to configure memory of an I/O adapter. The flowchart 500 more particularly shows a method of predicting and pre-allocating memory mapped I/O regions for eventual association with partitionable endpoints that correspond to I/O adapter physical functions. The illustrative method may be executed by one or more of the systems 100, 200, 300, 400 of FIGS. 1-4. Turning more particularly to the flowchart 500, the method at 502 may attempt to locate an entry in a configuration table that is associated with an I/O adapter. The configuration table may include adapter identifiers associated with different models of adapters. The configuration table may associate the adapter identifiers with model information that includes an amount and sizes of memory mapped I/O regions. For example, the configuration table 430 of FIG. 4 may be searched for a model identifier 432 that is associated with model information 434 of an identified adapter 402.

Where an adapter cannot be identified at 504 using the model identification information of the configuration table, the method may end at 506. Where the adapter is alternatively identified at 504, the system may retrieve a number of memory mapped I/O regions and associated sizes from the configuration table. For instance, the hypervisor 408 of FIG. 4 may access the model information 434 of the configuration table 430.

The number of memory mapped I/O regions supported at a slot may be determined at 510. The system 400, for example, may have knowledge of how many memory mapped I/O regions may be supported by a slot into which the hardware I/O adapter 402 is plugged. A PCIe root complex type of the slot may be known to support a predetermined number of memory mapped I/O regions. The hypervisor may create memory mapped I/O entries corresponding to the determined number of memory mapped I/O regions.

A first memory mapped I/O region may be placed in PCI address space at 512. The first memory mapped I/O region may be placed by the hypervisor such that a partitionable endpoint may be specified for the memory mapped I/O region. The memory mapped I/O region may be associated with a PCI address. For instance, the hypervisor 408 may associate each memory mapped I/O region 438 with a PCI address 437.

Where there is a next memory mapped I/O region to be placed at 514, that next memory mapped I/O region may be also be placed in PCI address space at 512. Where all of the memory mapped I/O regions have been placed, the PCI addresses may be associated with system addresses at 518. More particularly, system addresses may be determined for the PCI addresses of each of the memory mapped I/O regions. The determination may be made using a system-to-PCI mapping module of the PCIe root complex. The PCIe root complex 422 of FIG. 4 may determine system addresses 426 for each of the memory mapped I/O regions 424.

Each system address may be mapped at 520 to address space of the PF adjunct partition. For instance, system addresses 445 of FIG. 4 may be mapped to the address space 440 of the PF adjunct partition 412 using a hardware page table until all of the memory mapped I/O spaces have been mapped at 522.

Figure 6:
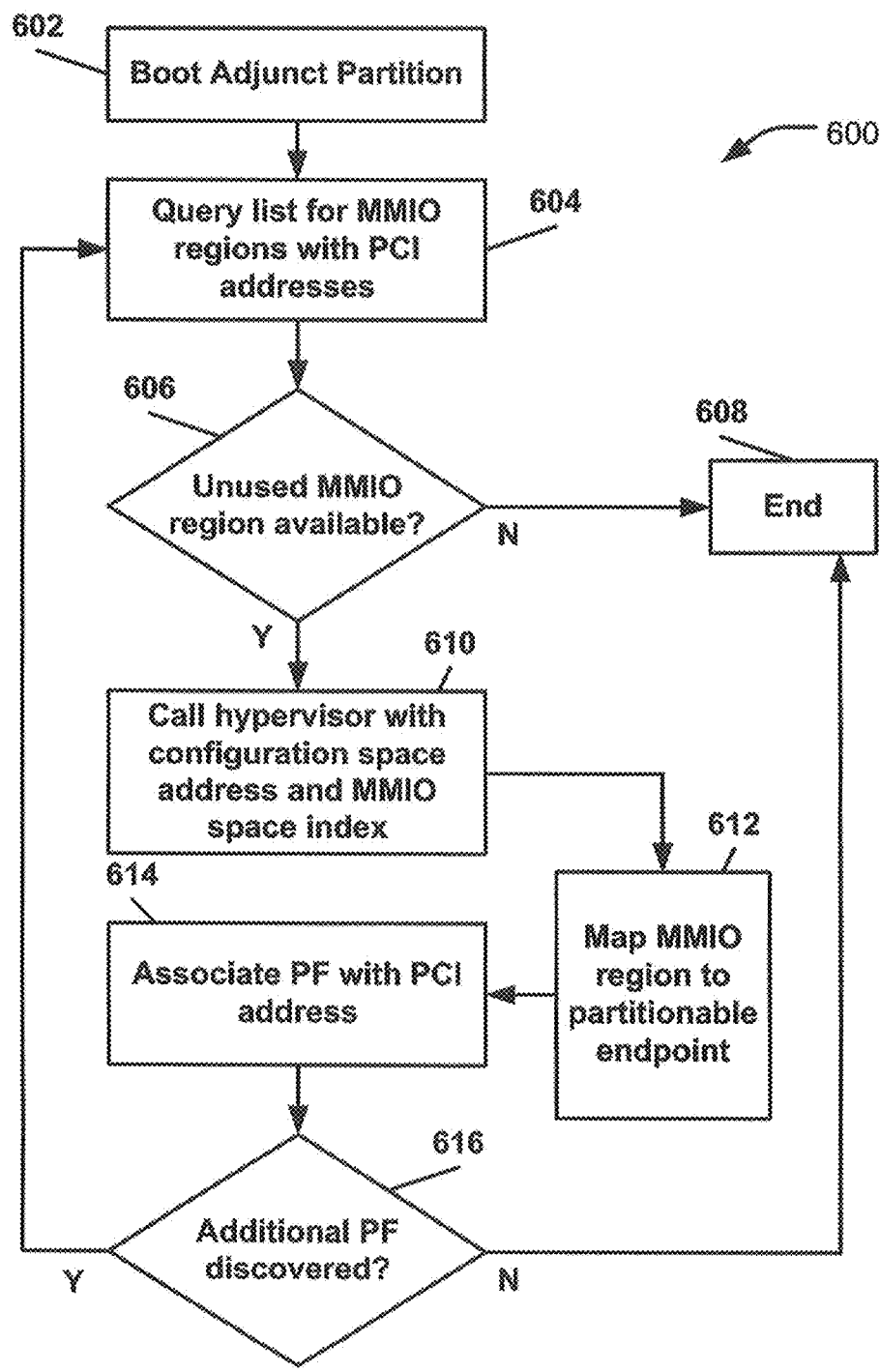
FIG. 6 is a flowchart of a process to associate memory mapped I/O regions with partitionable endpoints.

FIG. 6 is a flowchart 600 of an embodiment of a method to associate memory mapped I/O regions to partitionable endpoints. The memory mapped I/O regions may have been reserved for, but not yet associated with, physical functions that correspond to the partitionable endpoints. The illustrative method may be executed by one or more of the systems 100, 200, 300, 400 of FIGS. 1-4.

Turning more particularly to the flowchart 600, a PF adjunct partition may boot at 602. The PF adjunct partition may query the hypervisor at 604 for a list of memory mapped I/O regions. The memory mapped I/O regions may have corresponding PCI addresses. For example, the PF adjunct partition 412 of FIG. 4 may boot and query the memory mapped I/O regions 438 of the hypervisor address table 435. The address table 435 may include PCI addresses 437 that are associated with the memory mapped I/O regions 438.

The method may end at 608 where there are no more unused memory mapped I/O regions available at 606. Where there are alternatively unused memory mapped I/O regions available at 606, the PF adjunct partition may call the hypervisor with a configuration space address of a physical function at 610. The hypervisor may additionally provide memory mapped I/O regions to be used for that physical function. For instance, the PF adjunct partition 412 of FIG. 4 may determine that there is an additional memory mapped I/O region available in the list of memory mapped I/O regions 444 provided by the hypervisor 408. The PF adjunct partition 412 may then call the hypervisor 408 with a configuration space address 439 and with an associated memory mapped I/O region 444 (also associated with a physical function 414).

The hypervisor may use the configuration space address at 612 to map the memory mapped I/O region to a partitionable endpoint in the PCIe root complex. For example, the hypervisor 408 of FIG. 4 may determine the partitionable endpoints 436 using the configuration space address 439 and the memory mapped I/O region 438.

The PF adjunct partition may program at 614 the physical function of the adapter with the PCI address of its memory mapped I/O region. As a result, the adapter may accept a memory mapped I/O transaction at the specific physical function and may take the memory mapped I/O transaction to a read or write operation. For example, the PF adjunct partition 412 of FIG. 4 may program the physical function 414 with a PCI address 446 that is associated with the memory mapped I/O region 444. The illustrative method may continue to program physical functions with PCI addresses until no more are discovered at 616.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-MY) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of configuring system memory of a computer system, the computer system having at least one input/output (I/O) adapter attached thereto, the at least one I/O adapter capable of providing a plurality of physical functions to the computer system, the method comprising:
    assigning a memory region of the system memory to the at least one I/O adapter, the memory region being sub-divided into a plurality of sub-memory regions;
    associating each physical function being provided by the at least one I/O adapter to the computer system with a sub-memory region; and
    in response to detecting that an I/O error occurs, determining in which of the plurality of sub-memory regions the I/O error is located to isolate the physical function with which the sub-memory region is associated.

2. The method of claim 1, wherein isolating the physical function includes stopping the computer system from using the physical function.

3. The method of claim 1, wherein isolating the physical function includes stopping processes running on the computer system from using the physical function to transact I/O data.

4. The method of claim 1, wherein isolating the physical function includes halting I/O operations being handled by the physical function.

5. The method of claim 4, wherein halting the I/O operations includes halting processes using the physical function.

6. A computer system having a system memory, the computer system comprising:
    a memory for storing program code; and
    a processor for processing the program code to:
    assign a memory region of the system memory to at least one input/output (I/O) adapter when the at least one I/O adapter is attached to the computer system, the at least one I/O adapter capable of providing a plurality of physical functions to the computer system, wherein the memory region is sub-divided into a plurality of sub-memory regions;
    associate each physical function being provided by the at least one I/O adapter to the computer system with a sub-memory region; and
    in response to detecting that an I/O error occurs, determine in which of the plurality of sub-memory regions the I/O error is located to isolate the physical function with which the sub-memory region is associated.

7. The computer system of claim 6, wherein isolating the physical function includes stopping the computer system from using the physical function.

8. The computer system of claim 6, wherein isolating the physical function includes stopping processes running on the computer system from using the physical function to transact I/O data.

9. The computer system of claim 6, wherein isolating the physical function includes halting I/O operations being handled by the one physical function.

10. The computer system of claim 9, wherein halting the I/O operations includes halting processes using the physical function.

11. A program product on a non-transitory computer readable storage medium, the program product comprising:
    program code for:
    assigning a memory region of a system memory of a computer system to at least one I/O adapter attached thereto, the memory region being sub-divided into a plurality of sub-memory regions, the at least one I/O adapter capable of providing a plurality of physical functions to the computer system;
    associating each physical function being provided by the at least one I/O adapter to the computer system with a sub-memory region; and
    in response to detecting that an I/O error occurs, determining in which of the plurality of sub-memory regions the I/O error is located to isolate the physical function with which the sub-memory region is associated.

12. The program product of claim 11, wherein isolating the physical function includes stopping the computer system from using the physical function.

13. The apparatus of claim 11, wherein isolating the physical function includes stopping processes of the computer system from using the physical function to transact I/O data.

14. The program product of claim 11, wherein isolating the physical function includes halting I/O operations being handled by the one physical function.

15. The program product of claim 14, wherein halting the I/O operations includes halting processes using the physical function.

* * * * *